US007096769B2

(12) United States Patent
Biggs et al.

(10) Patent No.: US 7,096,769 B2
(45) Date of Patent: Aug. 29, 2006

(54) AUTOMATIC TOP SLICE REMOVAL DEVICE

(76) Inventors: Henry Biggs, 718 E. Airport Rd., Gallatin, TN (US) 37066; Steve Korteley, 718 E. Airport Rd., Gallatin, TN (US) 37066

(*) Notice: Subject to any disclaimer, the term of this patent is extended or adjusted under 35 U.S.C. 154(b) by 20 days.

(21) Appl. No.: 10/866,446

(22) Filed: Jun. 12, 2004

(65) Prior Publication Data

US 2005/0274245 A1 Dec. 15, 2005

(51) Int. Cl.
*A22C 17/00* (2006.01)

(52) U.S. Cl. .......................... 83/435.2; 83/107; 83/153; 83/813; 83/932; 452/153

(58) Field of Classification Search ................ 452/153; 83/932, 107, 155, 162, 813, 707, 422, 425, 83/435.2
See application file for complete search history.

(56) References Cited

U.S. PATENT DOCUMENTS 3,561,044 A * 2/1971 Evich .......................... 452/127
5,037,349 A * 8/1991 Perreault .................... 452/152
5,295,896 A * 3/1994 Petersen ..................... 452/135
6,716,097 B1 * 4/2004 Freund et al. .............. 452/149

* cited by examiner

*Primary Examiner*—Charles Goodman
(74) *Attorney, Agent, or Firm*—Adam H. Jacobs

(57) ABSTRACT

An automatic top slice removal device includes a frame, a lower conveyor belt and an adjustably mounted upper conveyor belt extending generally parallel with and spaced from the lower conveyor belt. A meat product slicing device includes a blade interposed between the upper conveyor belt and the lower conveyor belt to separate a top slice from the remainder of the meat product. A top slice separator plate is adjustably mounted between the upper conveyor belt and the lower conveyor belt and positioned rearwardly adjacent and vertically aligned with the blade and extends rearwards therefrom to maintain separation of the top slice and the remainder of the meat product between the belts. Finally, a top slice removal conveyor belt is positioned rearwards of the top slice separator plate and below the upper conveyor belt to remove the top slice from the remainder of the meat product.

8 Claims, 5 Drawing Sheets

AUTOMATIC TOP SLICE REMOVAL DEVICE

BACKGROUND OF THE INVENTION

1. Technical Field

The present invention is related to meat product cutting devices and, more particularly, to a top slice removal device which includes a frame, a lower conveyor belt mounted on the frame, an upper conveyor belt extending generally parallel with and spaced from the lower conveyor belt, a slicing device such as a bandsaw interposed between the upper and lower conveyor belts, a top slice separator plate adjustably mounted between the upper and lower conveyor belts, a top slice removal conveyor belt positioned rearwards of the separator plate for transporting the top slice for further processing and a rear conveyor belt for transferring the remainder of the meat product for further processing.

2. Description of the Prior Art

The meat packing industry has numerous types of slicing and cutting devices each designed to perform a specific function such as cutting a particular type of meat product or removing and separating one type of meat product from another during processing of the carcass. In the majority of these devices, however, the resulting waste product from the cut being performed must be manually removed from the machine by a worker and placed on a different conveyor system to be moved to further processing. Despite the fact that this type of labor is generally unskilled, it still must be performed to ensure proper functioning of the packing plant and thus the meat packing plant must provide a worker to perform this waste material removal process. When one adds up the total number of workers needed to remove waste meat products from these slicing and cutting devices, it is seen that a large percentage of the workers on the cutting room floor are involved in dealing with waste products which do not produce any substantial income for the meat packing plant. There is therefore a need for automated devices which remove waste products from the meat slicing and cutting devices and transfer them automatically to processing stations for those waste products.

A review of the prior art presently available makes it clear that little thought has been given to what needs to be done with the waste products from the cutting process, including such inventions as shown in Perreault, U.S. Pat. No. 5,037,349, and Petersen, U.S. Pat. No. 5,295,896. These devices are not designed to remove the waste products from the cutting process and transfer them to a separate processing location and even those devices in the prior art specifically designed for removal of specific waste product pieces are generally not designed for removal of the waste product piece to a different processing location. For example, one of the most common pieces of machinery in meat processing plants is the bandsaw slicer which is used to section cuts of meat into various pieces. One of the common uses of the bandsaw slicer is to remove what is referred to as the "top slice" which is generally found on a pork butt or beef butt and which is sliced off of the butt piece and discarded thus leaving the usable remainder of the butt piece. The dangers inherent in this procedure are readily apparent and include the machine operator possibly cutting him or herself on the bandsaw, the operator being caught up in the conveyor belt system trying to remove the top slice from the butt section or many other possible dangers encountered when the extremities of the operator must be inserted into the slicing and transporting machinery. There is therefore a need for an automated separation and removal system which will separate the top slice from the butt portion and transfer the top slice to a different processing area for continued processing of the top slice.

Therefore, an object of the present invention is to provide a top slice removal device which will automatically remove the separated top slice from a meat product.

Another object of the present invention is to provide an automatic top slice removal device which includes a frame, upper and lower conveyor belts cooperating to secure and move the meat product forward therebetween, a cutting blade interposed between the upper and lower conveyor belts for slicing the top slice off of the meat product and a separator plate for separating the top slice from the remaining meat product to permit the top slice to be removed and passed on to further processing.

Another object of the present invention is to provide a top slice removal device which further includes the separator plate extending rearwards of the end of the lower conveyor belt to retain the top slice thereon while the remainder of the meat product falls onto a rear conveyor belt to be transferred for further processing.

Another object of the present invention is to provide an improved top slice removal device which includes an top slice removal conveyor belt positioned rearwardly and below the upper conveyor belt for engaging and transferring the top slice from the location adjacent the remainder of the meat product to a new location for further processing of the top slice without requiring manual removal of the top slice.

Finally, an object of the present invention is to provide a top slice removal device which is relatively simple in design and operation and is safe and efficient in use.

SUMMARY OF THE INVENTION

The present invention provides an automatic top slice removal device including a frame, a lower conveyor belt mounted on the frame and an upper conveyor belt adjustably mounted on the frame and extending generally parallel with and spaced from the lower conveyor belt. A meat product slicing device such as a bandsaw includes a blade, the blade interposed between the upper conveyor belt and the lower conveyor belt operative to separate a top slice from the remainder of the meat product. A top slice separator plate is adjustably mounted on the frame between the upper conveyor belt and the lower conveyor belt and positioned generally rearwardly adjacent and generally vertically aligned with the blade, the top slice separator plate extending rearwards therefrom to maintain separation of the top slice and the remainder of the meat product between the upper and lower conveyor belts. Finally, a top slice removal conveyor belt is positioned rearwards of the top slice separator plate and below the upper conveyor belt, the top slice removal conveyor belt operative to receive the top slice thereon when the top slice separates from engagement between the upper conveyor belt and the top slice separator plate to remove the top slice from the remainder of the meat product.

The present invention addresses and corrects many of the disadvantages found in the prior art. For example, the use of the automatic top slice removal device will greatly reduce waste and inefficiency in the production of meat products as an additional worker is not needed to remove and transfer the top slice from the top slice device to another processing location. Furthermore, the relatively simple design of the present invention virtually ensures that the unit will have a relatively long usable lifespan and does not require specialized training to learn to use it, which is a boon to meat processing companies. Also, as the present invention is designed for use with many different meat product types, including meat, chicken, pork, fish, etc., it can be used in many different packing plants in many different situations. Finally, as the top slice removal device of the present invention performs the separation and removal of the top slice in one device, the processing of the meat product is performed without slowing or impeding the processing line. It is therefore seen that the present invention provides a substantial improvement over those devices found in the prior art.

DESCRIPTION OF THE PREFERRED EMBODIMENT

Figure 1:
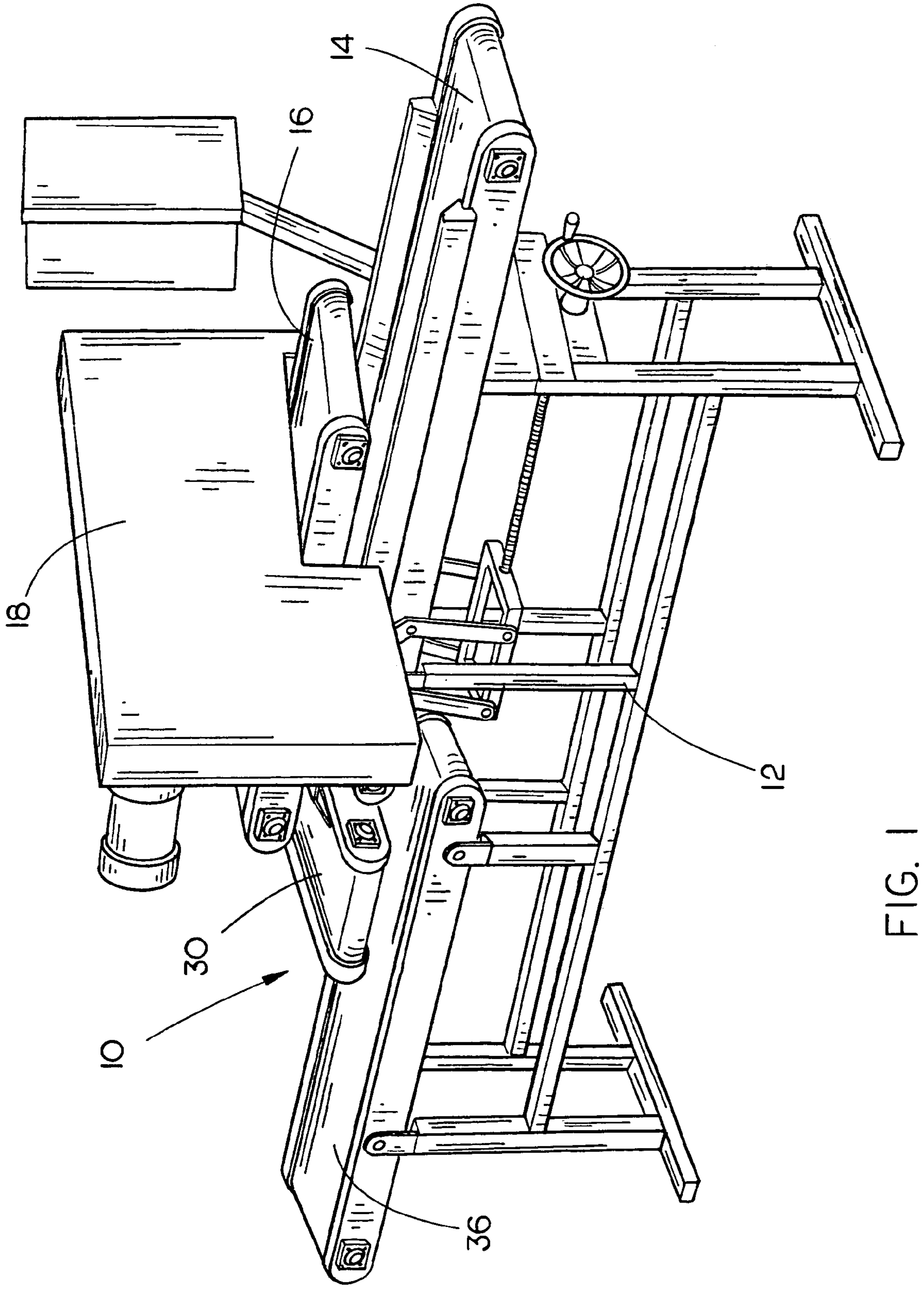
FIG. 1 is a perspective view of the automatic top slice removal device of the present invention.
Figure 2A:
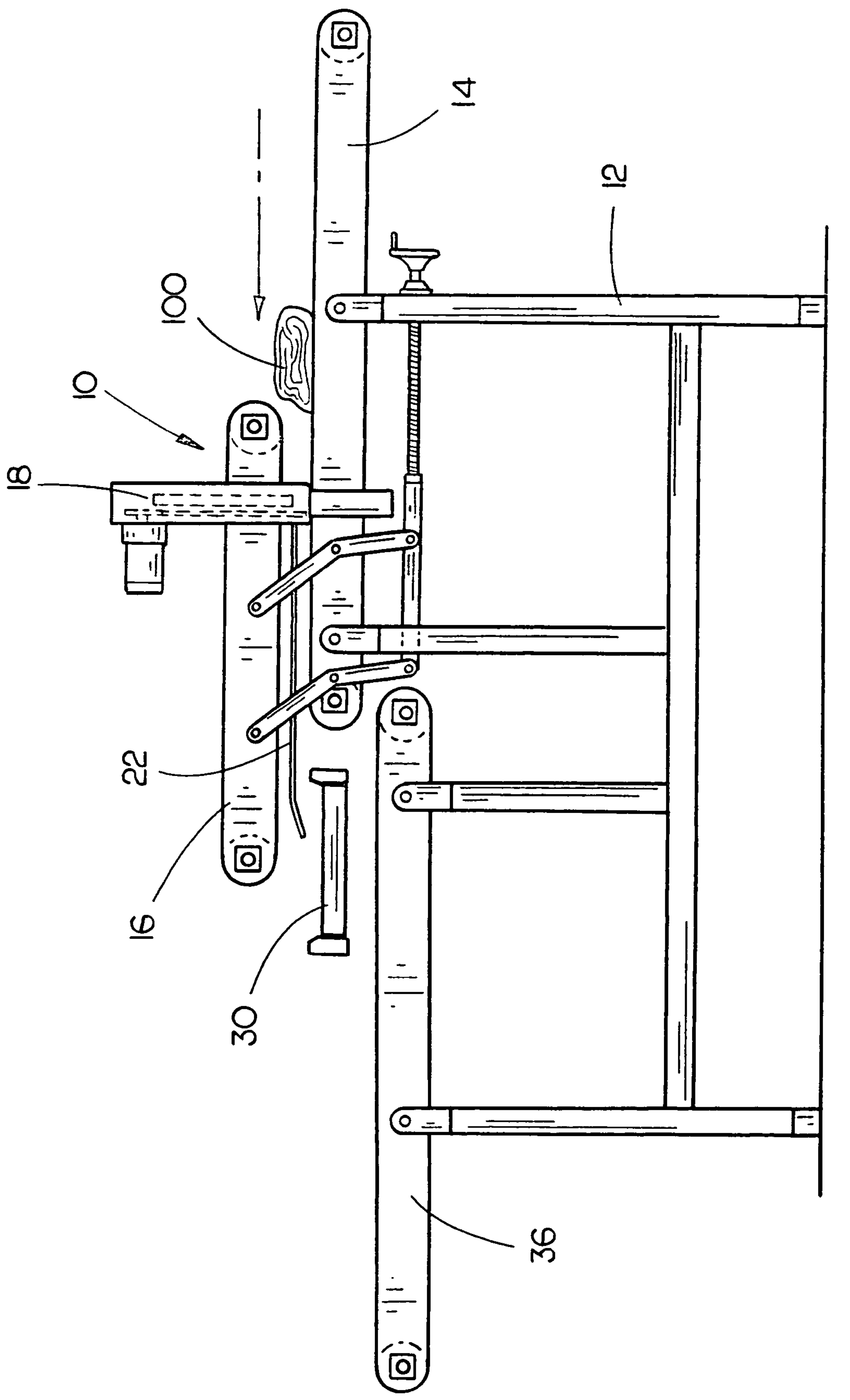
FIGS. 2A, 2B and 2C are side elevational views of the automatic top slice removal device of the present invention showing the automatic top slice removal device in operation.
Figure 2B:
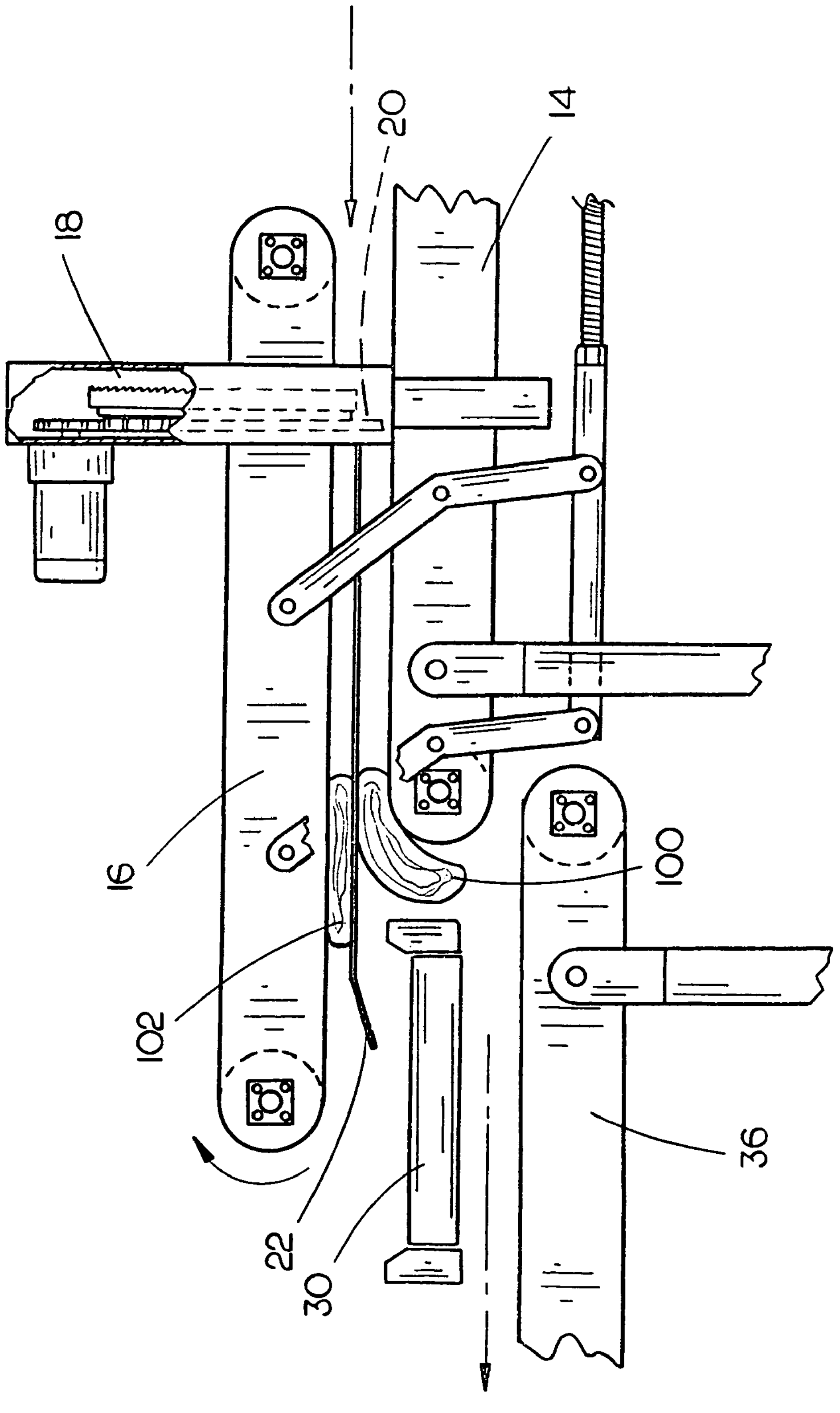
Figure 2C:
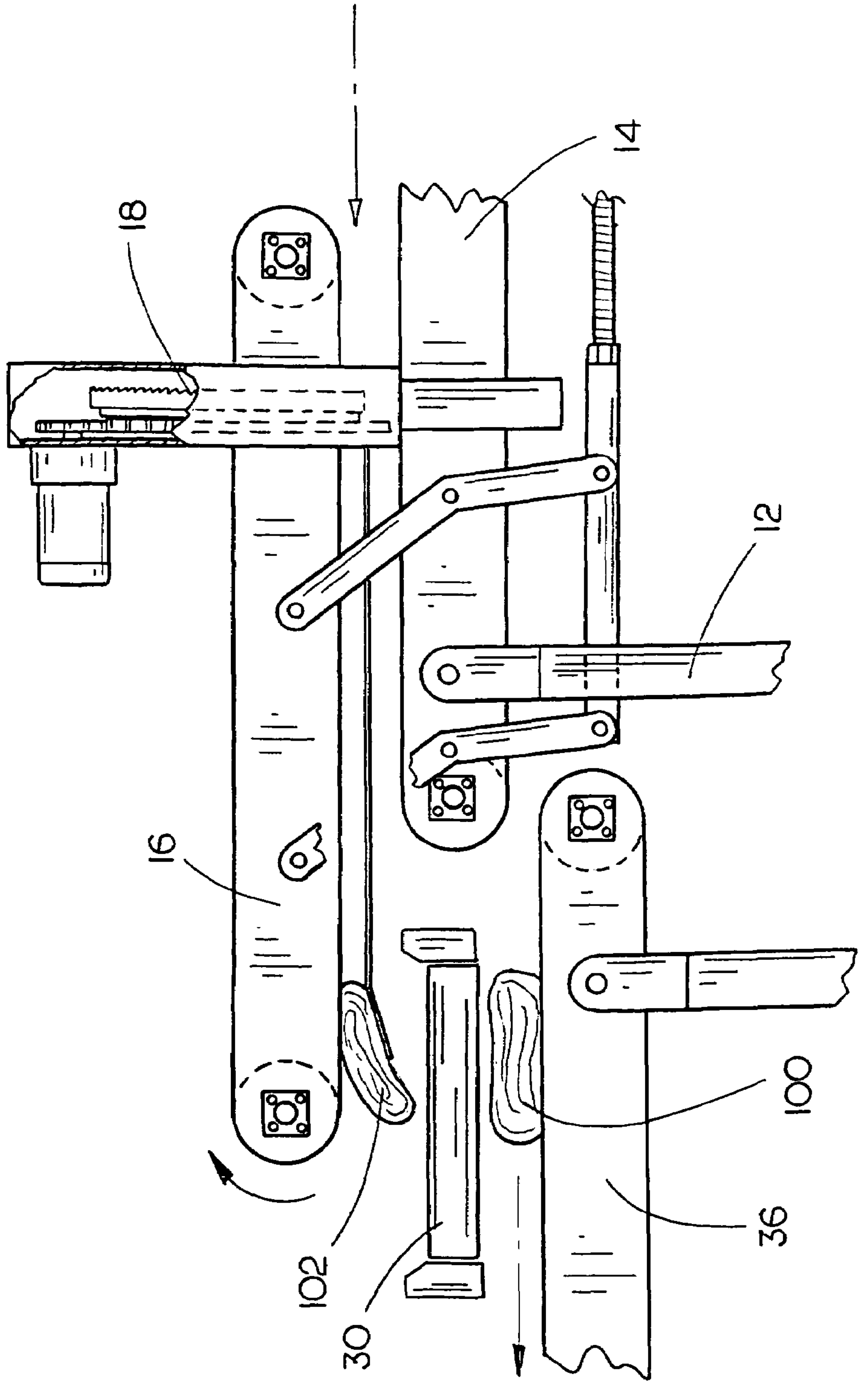
Figure 3:
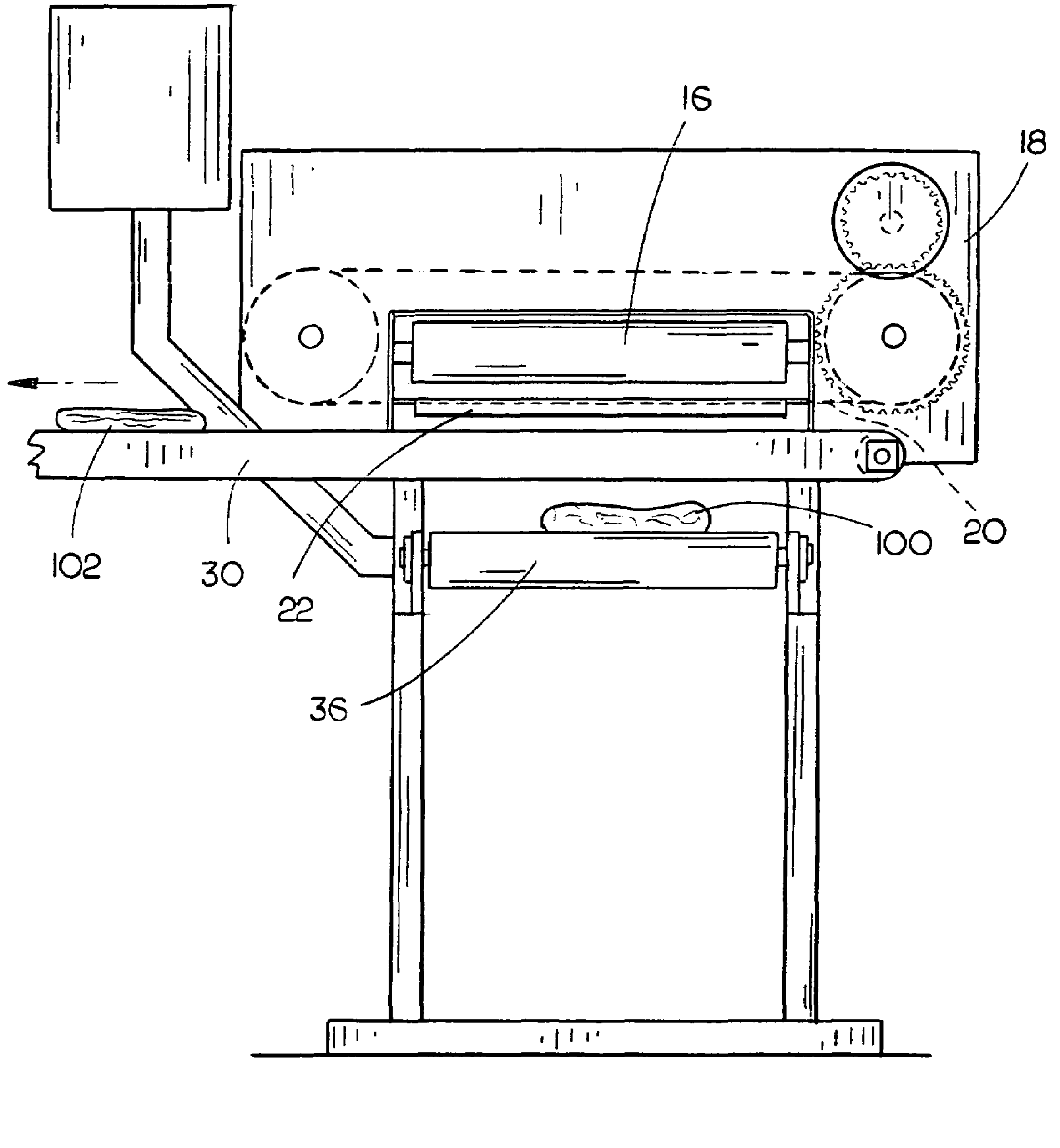
FIG. 3 is an end elevational view of the automatic top slice removal device in operation.

The top slice removal device 10 of the present invention is shown best in FIGS. 1–3 as including a frame 12 on which the device 10 rests and two conveyor belts, a lower conveyor belt 14 extending generally horizontally and an upper conveyor belt 16 adjustably mounted above and extending generally parallel with the lower conveyor belt 14. In the preferred embodiment, the lower and upper conveyor belts 14 and 16 would have lengths of approximately two feet to five feet, with the lower conveyor belt 14 extending forwards of the upper conveyor belt 16 to facilitate the placement of meat product thereon, and widths of approximately fifteen inches to thirty inches, depending on the meat product to be processed and the space available on the cutting floor for the top slice removal device 10. Furthermore, it should be noted that the use of lower and upper conveyor belts 14 and 16 to securely transport meat product therebetween is well known in the prior art and therefore the specific design features of each of the lower and upper conveyor belts 14 and 16, including mechanical arrangements and synchronization of the two belts, will not be discussed herein. It is expected, however, that the lower and upper conveyor belts 14 and 16 will cooperate to securely transport the meat product 100 through the top slice removal device 10 of the present invention and the numerous modifications and substitutions of elements and parts which are known in the industry for use in connection with lower and upper conveyor belts 14 and 16 are generally understood to be a part of this disclosure and a part of this invention.

The key inventive elements of the top slice removal device 10 of the present invention will now be described. As the meat product 100 is moved forward between the lower and upper conveyor belts 14 and 16, the meat product encounters cutting device 18 which, in the preferred embodiment, would be a bandsaw-type cutting blade, although numerous other types of cutting blades may be substituted which will perform the intended meat sectioning task. The cutting device 18 further includes a cutting blade 20 which is interposed between the lower and upper conveyor belts 14 and 16 and is vertically adjustable to permit adjustment of the thickness of the top slice 102 which is to be separated from the meat product 100. Mounted adjacent to and immediately behind cutting blade 20 is a separator plate 22 which, in the preferred embodiment, would consist of a generally thin planar piece of high impact plastic such as UHMW or of metal such as stainless steel or like which is generally low friction to prevent sticking of the meat product 100 and top slice 102 thereto, the separator plate 22 being generally vertically aligned with and vertically moveable with the cutting blade 20 such that vertical adjustment of the cutting blade 20 between lower and upper conveyor belts 14 and 16 results in vertical adjustment of the separator plate 22 which is mounted directly behind and spaced only a few thousandths of an inch behind the cutting blade 20. As the meat product 100 is transported between lower conveyor belt 14 and upper conveyor belt 16 forwards on the top slice removal device 10 towards cutting blade 20, the cutting blade 20 divides the top slice 102 from the remainder of the meat product 100, the top slice 102 then being disengaged from the meat product 100 by separator plate 22.

As the meat product 100 with the separated top slice 102 reaches the end of lower conveyor belt 14, a second important feature of the top slice removal device 10 of the present invention is encountered. Specifically, because the separator plate 22 extends rearwards from the cutting blade 20 to generally adjacent the rear end of upper conveyor belt 16, as the meat product 100 moves rearwards on the top slice removal device 10, the meat product 100 and top slice 102 are separated by the separator plate 22 with the upper conveyor belt 16 engaging and moving top slice 102 forwards within the top slice removal device 10 and the lower conveyor belt 14 engaging and moving meat product forwards within the top slice removal device 10. In the preferred embodiment, lower conveyor belt 14 ends forwards of the end of upper conveyor belt 16 and the meat product 100 thus reaches the end of lower conveyor belt 14 prior to top slice 102 reaching the end of upper conveyor belt 16 and separator plate 22. The meat product 100 then falls off of the lower conveyor belt 14 onto a rear conveyor belt 36 which extends rearwards from the lower conveyor belt 14 and is positioned below lower conveyor belt 14 as shown in FIG. 2B.

The positioning of the rear conveyor belt 36 is important in that the movement of the meat product 100 downwards provides space for the positioning of top slice conveyor belt 30, which is positioned rearwards of lower conveyor belt 14 with a forward portion thereof directly underneath the rearward end of the separator plate 22. As the forward portion of the top slice 102 reaches the end of separator plate 22, as shown in FIG. 2C, it falls downwards and lands on top slice removal conveyor belt 30. In the preferred embodiment, the top slice removal conveyor belt 30 would be approximately two to ten feet in length and would extend off to one side of the upper conveyor belt 16 in order to quickly and simply remove the top slice 102 to a different location for further processing thereof. Of course, the precise location, direction of travel and design of the top slice conveyor belt 30 is not critical to the present invention so long as the forward end of the top slice conveyor belt 30 is positioned beneath the end of the separator plate 22, and the top slice conveyor belt 30 may be modified or changed depending upon the intended top slice transfer characteristics desired in connection with the top slice conveyor belt 30.

It may be desirable to include one or more scrapers (not shown) which are mounted adjacent the lower and upper conveyor belts 14 to ensure that the meat product 100 and the top slice 102 do not remain attached by adhesion to the belts. Of course, other devices may be used to prevent the unintended attachment of the top slice 102 and meat product 100 to the various conveyor belts, the inclusion of which would be understood by one skilled in the art of meat processing devices.

Once the top slice 102 has been removed from the top slice removal device 10 via the top slice conveyor belt 30, the remaining meat product 100, still on rear conveyor belt 36, is available for continued processing. As the top slice 102 is automatically removed, the worker manning the top slice removal device 10 may continue to process only the meat product 100 which will result in increased savings in both time and expense for the processing location using the top slice removal device 10 of the present invention.

It is to be understood that numerous additions, modifications and substitutions may be made to the top slice removal device 10 of the present invention which fall within the intended broad scope of the appended claims. For example, although the elements of the present invention have been described with some particularity, it should be noted that the functionality of those elements are the critical aspects thereof and therefore minor modifications to the elements, which are expected, remain within the purview of this disclosure. Furthermore, it should be noted that each of the conveyors, plates, scrapers and other elements of the invention are preferably adjustable in vertical and horizontal directions to allow for different size products to be run through the top slice removal device 10 of the present invention, and such adjustment mechanisms are well known in the prior art and are shown in FIGS. 1–3. Finally, the present invention is intended to be used with many different types of meat products, including pork, fish, poultry, turkey or beef, in addition to any other type of meat products which may be processed.

There has therefore been shown and described a top slice removal device 10 which accomplishes at least all of its intended objectives.

We claim:

1. An automatic top slice removal device comprising:

a frame;

a lower conveyor belt having a forward end and a rearward end, said lower conveyor belt mounted on said frame;

an upper conveyor belt adjustably mounted on said frame and extending generally parallel with and spaced from said lower conveyor belt;

said lower conveyor belt and said upper conveyor belt cooperating to engage and compress a meat product therebetween and transport the meat product through said automatic top slice removal device towards said rearward end of said lower conveyor belt;

meat product slicing means including blade means, said blade means interposed between said upper conveyor belt and said lower conveyor belt operative to separate a top slice from the remainder of the meat product;

a top slice separator plate adjustably mounted on said frame interposed between said upper conveyor belt and said lower conveyor belt and positioned generally rearwardly adjacent and aligned generally coplanar with said blade means, said top slice separator plate extending rearwards to maintain separation of the top slice and the remainder of the meat product; and a top slice removal conveyor belt positioned below and partially rearwards of said top slice separator plate below said upper conveyor belt operative to receive the top slice thereon when the top slice separates from engagement with said upper conveyor belt and said top slice separator plate to remove the top slice from the remainder of the meat product.

2. The automatic top slice removal device of claim 1 further comprising a rear conveyor belt means mounted rearwards of said lower conveyor belt and generally adjacent thereto such that upon the remainder of the meat product disengaging from said lower conveyor belt, said rear conveyor belt is operative to engage and transport the remainder of the meat product to another location.

3. The automatic top slice removal device of claim 1 wherein said meat product slicing means comprises a bandsaw and said blade means comprises a bandsaw blade.

4. The automatic top slice removal device of claim 3 wherein said top slice separator plate comprises a generally thin planar sheet of substantially low friction material.

5. The automatic top slice removal device of claim 1 wherein said top slice separator plate is positioned rearwards of said blade means between one-thousandth and one half (0.001 and 0.5) inches.

6. An automatic top slice removal device comprising:

a frame;

a lower conveyor belt having a forward end and a rearward end, said lower conveyor belt mounted on said frame;

an upper conveyor belt adjustably mounted on said frame and extending generally parallel with and spaced from said lower conveyor belt;

said lower conveyor belt and said upper conveyor belt cooperating to engage and compress a meat product therebetween and transport the meat product through said automatic top slice removal device towards said rearward end of said lower conveyor belt;

a bandsaw including a bandsaw blade interposed between said upper conveyor belt and said lower conveyor belt operative to separate a top slice from the remainder of the meat product;

a top slice separator plate adjustably mounted on said frame interposed between said upper conveyor belt and said lower conveyor belt and positioned generally rearwardly adjacent and aligned generally coplanar with said bandsaw blade interposed between said upper conveyor belt and said lower conveyor belt, said top slice separator plate extending rearwards to maintain separation of the top slice and the remainder of the meat product;

a top slice removal conveyor belt positioned below and at least partially rearwards of said top slice separator plate and below said upper conveyor belt operative to receive the top slice thereon when the top slice separates from engagement with said upper conveyor belt and said top slice separator plate to remove the top slice from the remainder of the meat product; and a rear conveyor belt means mounted rearwards of said lower conveyor belt and generally adjacent thereto such that upon the remainder of the meat product disengaging from said lower conveyor belt, said rear conveyor belt is operative to engage and transport the remainder of the meat product to another location.

7. The automatic top slice removal device of claim 6 wherein said top slice separator plate comprises a generally thin planar sheet of substantially low friction material.

8. The automatic top slice removal device of claim 6 wherein said top slice separator plate is positioned rearwards of said blade means between one-thousandth and one half (0.001 and 0.5) inches and said top slice separator plate extends rearwards beyond the rear end of said lower conveyor belt.

* * * * *